United States Patent [19]
Konno

[11] Patent Number: 4,751,538
[45] Date of Patent: Jun. 14, 1988

[54] CONTACT DEVICE FOR CAMERA

[75] Inventor: Tatsuo Konno, Kanagawa, Japan

[73] Assignee: Canon Kabushiki Kaisha, Tokyo, Japan

[21] Appl. No.: 898,315

[22] Filed: Aug. 20, 1986

[30] Foreign Application Priority Data

Aug. 22, 1985 [JP] Japan .......................... 60-128308[U]

[51] Int. Cl.$^4$ .......................... G03B 1/04; G03B 17/02
[52] U.S. Cl. .................................... 354/212; 354/106; 354/288
[58] Field of Search .............. 354/105, 106, 109, 288, 354/295, 212, 486

[56] References Cited

U.S. PATENT DOCUMENTS

| | | | |
|---|---|---|---|
| 3,451,322 | 6/1969 | Noda et al. | 354/288 |
| 3,528,352 | 9/1970 | Ikegami | 354/288 |
| 4,232,956 | 11/1980 | Hashimoto et al. | 354/106 |
| 4,299,466 | 11/1981 | Harvey | 354/173.1 |
| 4,482,229 | 11/1984 | Sugiura | 354/288 |

FOREIGN PATENT DOCUMENTS

| | | | |
|---|---|---|---|
| 2920787 | 11/1979 | Fed. Rep. of Germany | 354/288 |
| 57-104128A | 6/1982 | Japan | 354/288 |

Primary Examiner—A. A. Mathews
Attorney, Agent, or Firm—Fitzpatrick, Cella, Harper and Scinto

[57] ABSTRACT

A camera having a back cover capable of electrically communicating with the camera body. The camera body and the back cover each have a plurality of contact elements. When the back cover is closed on the camera body, their contact elements in each pair come in contact with each other so that electrical communication is established therebetween. The plurality of pairs of the contact elements are arranged in almost parallel row-like relation to an axis about which the back cover is pivotal, constituting the contact device of the invention.

7 Claims, 4 Drawing Sheets

CONTACT DEVICE FOR CAMERA

BACKGROUND OF THE INVENTION

1. Field of the Invention:

This invention relates to cameras and more particularly to a contact device in a camera.

2. Description of the Related Art:

FIG. 6 is a back elevational view of a typical example of the conventional camera with its back cover opened. In the drawing, a camera body 1 has a back cover 2 pivotally mounted thereto by a hinge portion 3. In the camera body 1 there are a film cartridge chamber 4, a picture frame portion (aperture) 5, a film takeup spool chamber 6 containing a spool 7 and a sprocket 8, a film windup lever 9 and a finder peep window (eyepiece) 10.

In the back cover 2 of the camera, there are a leaf spring 11 as a presser for the loaded film cartridge, a film presser plate 12, and a roller 13 for pressing the film against the spool 7, all arranged on the inner surface of the back cover 2.

In this example of the camera, a date printing system (not shown), for example, is provided behind the film presser plate 12. From this reason, a date imprinting window portion 14 is formed in the upper corner of the film presser plate 12. The provision of the date imprinting system or the like to the camera back cover 2 side is itself known publicly. 15a, 15b, 16a, and 16b are contact elements of circuit terminals arranged respectively on the camera body 1 side and the cack cover 2 side in order to perform electrical intercommunication between a control circuit (not shown) in the camera body 1 and the functional mechanism (or circuit) (not shown) provided in the camera back cover 2. The contact elements 15a and 15b on the camera body side are provided in the lower side portion of the camera body 1 as laterally arranged. The contact elements 16a and 16b of the back cover 2 are arranged in symmetric positions to the contact elements 15a and 15b of the camera body 1 respectively with respect to the axis of the hinge portion 3.

So, when the back cover 2 is closed on the camera body 1, the contact elements 16a and 16b of the back cover 2 touch the contact elements 15a and 15b of the camera body 1 respectively, and they are electrically connected to each other. Thus, an electrical connection is made between the control circuit in the camera body 1 and the functional system in the back cover 2.

By the way, recently, the camera back cover or interchangeable back cover tends not only to have the date imprinting function but also to be made of multiple function by adding, for example, a function of printing desired data, and further a command function of specifying shooting conditions such as the interval time and the number of frames to be automatically shot, and a setting function of exposure conditions such as arbitrary setting of a program line graph in the programmed mode. For this reason, the communication between the camera body and the back cover becomes complicated. This leads to increase the number of contact elements for communication between them.

To lay out the required number of contact elements for communication on the camera body 1 side and the back cover 2 side, if they are arranged in accordance with the layout of the above-described conventional camera of FIG. 6, the number of contacts increases, such as that shown in FIG. 7. That is, assuming that, for what is shown in FIG. 6, two contact elements are added to each of the camera body 1 and the back cover 2, namely, the contact elements 15c, 15d, 16c, 16d are added, then the additional contact elements must be arranged as shown in FIG. 7, or the additional contact elements 15c and 15d of the camera body 1 side are arranged in the lower side portion of the camera body 1 in a horizontal row adjacent to the contact elements 15a and 15b, or, due to space limitations, for example, on the portion above the film cartridge chamber 4 as the contact elements 15c' and 15d'. In accordance with this, the contact elements 16c and 16d (16c' and 16d') of the back cover 2 side are arranged in the corresponding positions to the contact elements 15c and 15d (15c' and 15d') of the camera body 1 side respectively.

However, such a contact element layout as shown in FIG. 7 has the following drawbacks:

(1) As can be said generally on the points of contact of the contact elements, in order to prevent poor contact of the point of contact, it is required for the contact element to have a self-cleaning effect. In the case of the contact elements of the back cover side, due to the closing locus of the back cover, the nearer the contact element arranged to the axis of rotation of the back cover, the higher the self-cleaning effect obtained. Therefore, in the contact element arrangement of lateral one row, the farther the contact element from the axis of rotation of the back cover, the weaker the self-cleaning effect becomes, and, therefore, a greater possibility of poor electrical contact occurs.

(2) In the conventional example, the layout of the contact element arrangement is influenced by the limited internal space of the camera. For this reason, the contact elements may be arranged in separate areas quite apart from each other with the difficulty of fabrication and the number of assembly steps being increased. As a result, production cost is increased. Also, in some cases, it may require a height increase in the camera.

Now, for information, an example of the conventional circuit with which the above-described contact elements are used is given in FIG. 8.

A circuit 1' in the camera body 1 includes a battery 107, a control circuit 108 for the camera connected in parallel to the battery 107, a buzzer 112 connected in parallel to the battery 107 through a resistor 111, and a transistor 110 for driving the buzzer 112. The collector-emitter path of the transistor 110 is connected across the buzzer 112, and its base is connected to the control circuit 108 through a resistor 109 and also to the negative terminal of the battery 107 or a connection terminal 104a for ground, through a resistor 113. A normally open switch 114 is arranged to turn on when a camera release is actuated, and is connected between the control circuit 108 and the connection terminal 104a. Also, the base of the transistor 110 is connected to a connection terminal 106a for display. That pole of the switch 114 which is connected to the control circuit 108 is connected to a connection terminal 105a for triggering a data imprinter.

A data imprinting circuit 2' incorporated in the back cover 2 includes a battery 127, a data imprinting control circuit 115 connected in parallel to the battery 127 and having another terminal which is connected to a connection terminal 105b for trigger, the negative terminal of the battery 127 being connected to a connection terminal 104b for ground, and light emitters 116 such as LEDs with their segment terminal groups being connected to the control circuit 115 and their common terminal Cm being connected to the connection terminal 104b for ground through a transistor 118, the base of the transistor 118 being connected to a terminal C of the control circuit 115 through a resistor 117.

A battery checking circuit 121 is connected in parallel to the battery 127 through a transistor 120. A monostable multivibrator 122 is connected to the output of the checking circuit 121. 123 is also a monostable multivibrator which is connected to the terminal C of the control circuit 115. The pulse width of the monstable multivibrator 123 is shorter than that of the monostable multivibrator 122. Also, the base of the transistor 120 is connected to the common terminal Cm of the light emitters 116 through a resistor 119, and to the positive terminal of the battery 127 through a resistor 144.

A NOR gate 125 is connected to the output of the monostable multivibrator 122 and through an inverter 124 to the output of the monostable multivibrator 123. An astable multivibrator 126 is connected to the output side of the NOR gate 125 and through a resistor 128 and a diode 129 to a connection terminal 106b for display. When the input of the astable multivibrator 126, or the output of the NOR gate 125, is high level, the oscillation of the vibrator 126 stops.

In operating the circuit comprised of the above-described members, when release of the camera body 1 is carried out, the switch 114 turns on, causing the connection terminals 105a, 105b to become low level. Responsive to this signal of low level, the control circuit 115 starts an imprinting operation by driving the light emitters 116 and changing and maintaining the terminal C to and at high level for a time $T_0$ necessary to the imprinting.

Then, the transistors 118 and 120 turn on to energize the light emitters 116, thereby the imprinting is performed, and at the same time the checking circuit 121 also operates.

If, at this time, the voltage of the battery 127 is higher than the checking voltage $V_{BAT}$ of the battery, in other words, the voltage obtained by subtracting the voltage drop Vz due to the constant voltage diode 132 from the voltage of the battery 127 and dividing it by the resistors 130 and 135 as appearing across the resistor 135 is higher than the voltage $V_{BE}$ across the base-emitter path of the transistor 137, because the transistor 137 turns on, the output, e, of the checking circuit 121 remains low, and the monostable multivibrator 122 does not operate.

Meanwhile, the monostable multivibrator 122 responsive to the falling edge of the pulse from the terminal C of the control circuit 115 produces a pulse which takes low level for a constant time $T_1$ determined by the time constant of the resistor 142 and capacitor 143. That is, a pulse which is high or the time $T_1$ is produced at the output, g, of the inverter 124. As a result, the output, h, of the NOR gate 125 becomes a pulse of low level with the width $T_1$. Thus, during the time when the output, h, of the NOR gate 125 is low level, the astable multivibrator 126 oscillates at a frequency, f, determined by the resistor 144 and capacitor 145, and this oscillation causes the transistor 110 in the camera body 1 to turn on and off repeatedly and the buzzer 112 to produce a sound.

In other words, each time the printing operation has been carried out and the light emission terminates, the buzzer 112 produces a sound for the constant time $T_1$.

In case when the voltage of the battery 127 is lower than the check voltage $V_{BAT}$, despite the fact that the checking circuit 121 is supplied with current, the transistor 137 does not turn on. Therefore, the capacitor 139 connected between the output of the checking circuit 121 and the connection terminal 104b for ground is charged through the resistor 131. When the output, e, of the checking circuit 121 exceeds the threshold voltage $V_{TH}$ of the input side of the monostable multivibrator 122, the monostable multivibrator 122 then operates, producing a pulse of duration $T_2$ determined by the time constant of the resistor 140 and the capacitor 141.

At this time, similar to the case when the voltage of the battery 127 is higher than the check voltage $V_{BAT}$, the pulse of width $T_1$ appears at the output, g, of the inverter 124. But, the output, h, of the NOR gate 125 becomes low only for the time equal to the pulse width $T_2$, and the buzzer 112 produces a sound for the time $T_2$.

SUMMARY OF THE INVENTION

An object of the present invention is to provide a contact device for a camera capable of easily coping with an increase in the number of pairs of contact elements which come in contact with each other when the back cover of the camera body is closed.

Other objects of the invention will become apparent from the following detailed description.

DETAILED DESCRIPTION OF THE PREFERRED EMBODIMENTS

Figure 1:
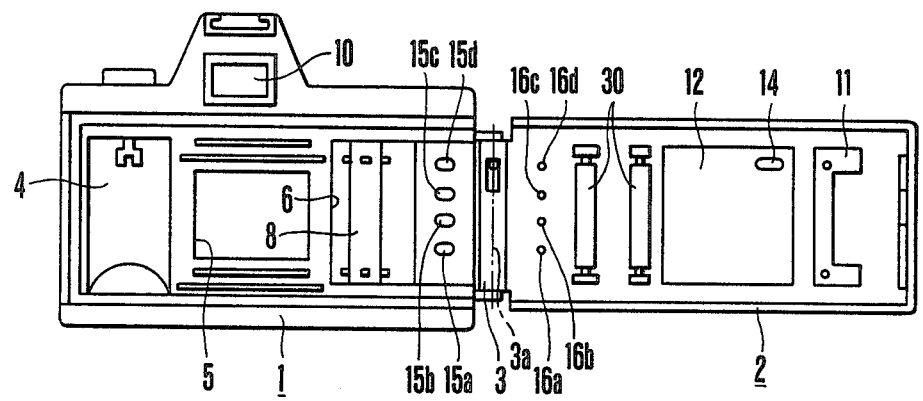
FIGS. 1 to 5(c) illustrate an embodiment of the contact device for camera according to the present invention, with FIG. 1 being a back elevational view of the camera with its back cover open, FIG. 2 being a cross-sectional view of the spool chamber and its adjacent portions, FIG. 3 being a fragmentary exploded perspective view of the right hand side portion of the camera body, FIG. 4 being a perspective view of the same portions as those of FIG. 3, and FIGS. 5(a), 5(b) and 5(c) illustrating the self-cleaning operation of the contact elements.

FIGS. 1 to 5(c) illustrate an embodiment of the camera according to the present invention. The camera in this embodiment is the one provided with the auto-loading mechanism for film. The constituent members in common with the above-described camera of FIG. 6 are labelled with the similar reference characters and no further explanation is necessary. Also, the back cover 2 of the camera of this embodiment is an interchangeable back cover, and is used as releasably attached to the camera body 1 at the hinge portion 3.

The camera of this embodiment has four pairs of contact elements 15 and 16 as shown in FIG. 1. In the camera body 1, the four contact elements 15a to 15d are arranged in the neighbourhood of the axis of rotation (hinge portion 3) of the back cover 2 in one vertical row on an almost parallel line to the axis 3a of the hinge portion 3. The four contact elements 16a to 16d of the back cover 2 corresponding to contact elements 15a to 15d are similarly arranged in one row in the corresponding positions to the contact elements 15a to 15d arranged in the camera body 1. When the back cover 2 of the camera body 1 is closed, the contact elements 16a to 16d of the back cover 2 come in contact with the contact elements 15a to 15d of the camera body under suitable pressure. This state is maintained so that electrical intercommunication occurs between the control circuit in the camera body 1 and the functional mechanism in the back cover 2.

Figure 2:
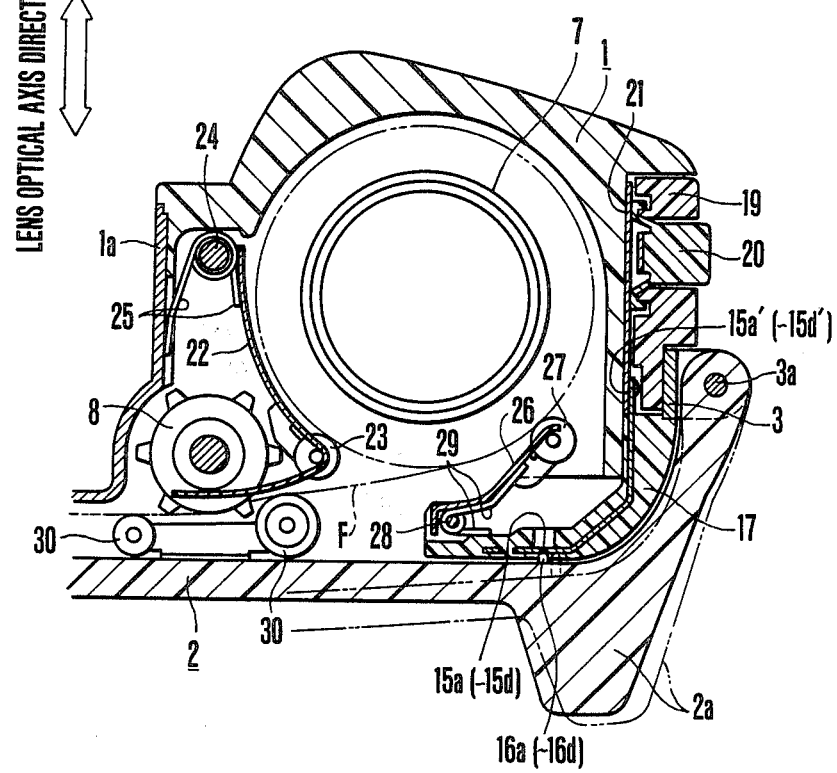
Figure 3:
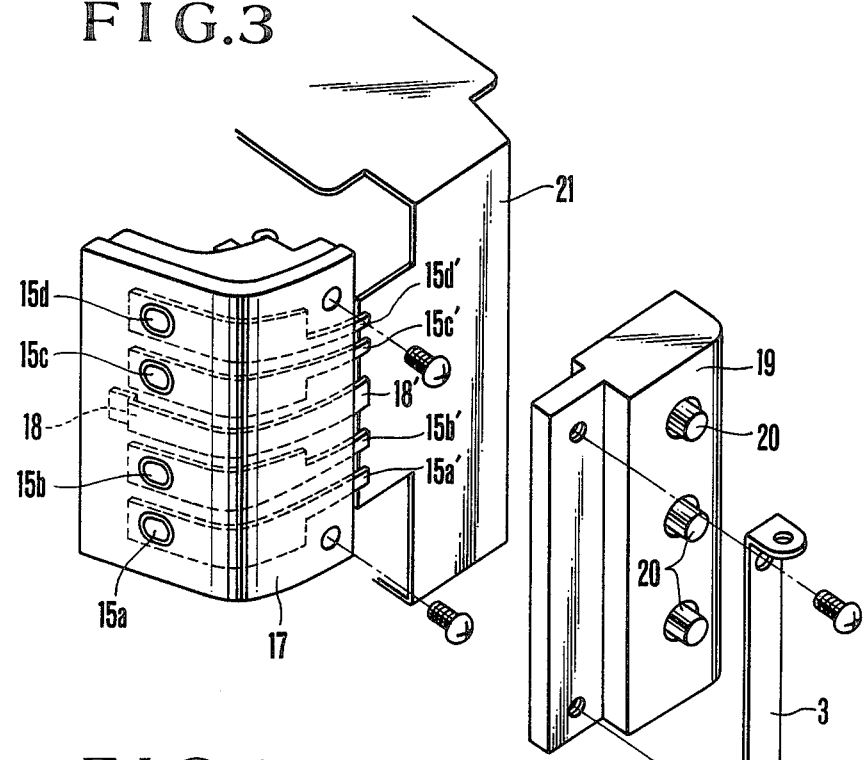
Figure 4:
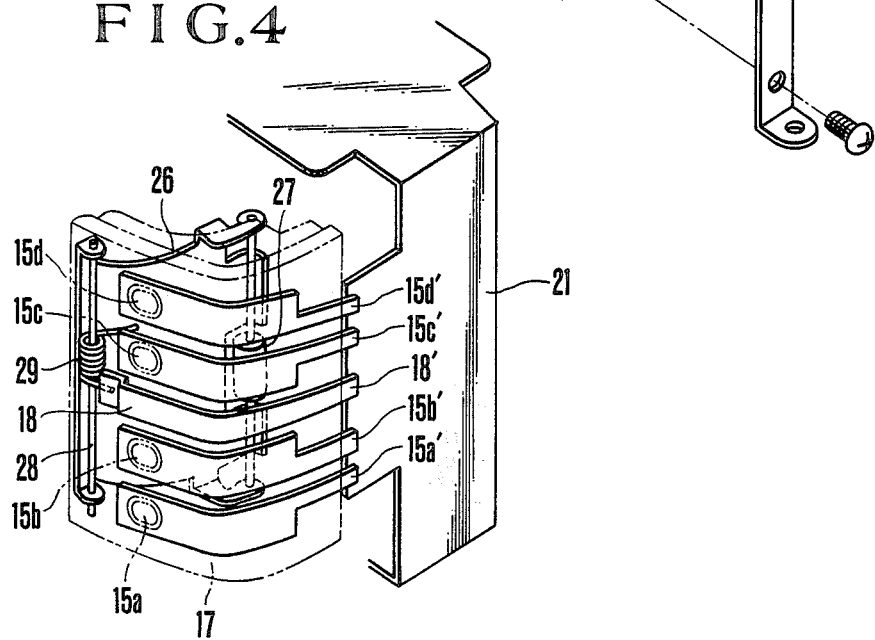

FIG. 2 is a cross-sectional view of the spool chamber portion of the right hand side of the camera with the back cover 2 closed, FIG. 3 is an exploded perspective view of the right hand side portion of the camera body, and FIG. 4 is a phantom perspective view of the same portion. The camera body 1 is formed by insert molding with a metal framework 1a, or a so-called two-member unified body. A finger-rest protruding portion 2a for the thumb of the right hand is formed on the right hand side of the back cover 2 to hold the camera (by grasping). A holder 17 supporting members constituting part of a film auto-loading mechanism is fixed to the camera body 1 and is formed with the contact elements 15a to 15d of the camera body side and an earth contact piece 18 (FIGS. 3 and 4) by insert-molding techniques. The holder 17 is a molded article of engineering plastic such as poly carbonate or the like. The above-described body side contact elements 15a to 15d in the holder 17 are arranged in a nearly lens optical axis direction (see FIG. 2) to the spool 7. The back cover side contact elements 16a to 16d are, as shown in FIG. 5(c), urged by spring members 50 (coil springs) in a projecting direction, and are supported in holes 52 to be movable in the direction of their axis. These back cover side contact elements 16a to 16d are arranged near the finger-rest portion 2a. Therefore, the internal space at this location is wide and a large degree of freedom can be given to the design of the movable mechanism and mounting. 19 and 20 are respectively an operating button holder and an operating button arranged in the right hand side panel of the camera body. A flexible printed circuit board 21 has switching patterns (not shown) for the operating button 20. Moreover, wiring patterns which are connected by solder or the like to the elongated ends 15a' to 15d' and 18' of the camera body side contact elements 15a to 15d and earth contact piece 18 are also applied on the board 21.

A film auto-loading (AL) guide 22 is pivotal about a shaft 24. An AL guide roller 23 is rotatably mounted on the guide 22, and is urged by a torsion spring 25 always toward the spool 7. One end of the torsion spring 25 is in contact on the insert metal framework 1a of the camera body 1. 26 is an AL guide provided inside the above-described holder 17 and pivotal about an axis 28. An AL guide roller 27 rotatably mounted on the guide 26 is urged by a torsion spring 29 always turn toward the spool 7. One end of the torsion spring 29 is in contact with the earth contact piece 18 which is partly exposed from the holder 17 (FIG. 4). 30 is a back cover guide roller arranged on the inner surface of the back cover 2. Thus, the spool 7, sprocket 8, and the above-described AL guide 22, AL roller 23, AL guide 26, AL roller 27, film guide roller 30 constitute a publicly known AL mechanism, and the film F is auto-loaded.

The AL guide 22 and AL roller 23 are connected through the torsion spring 25 to the circuit earth or insert metal framework 1a. The AL guide 26 and AL roller 27 are grounded through the torsion spring 29, earth contact piece 18 and flexible printed circuit board 21 to the camera body earth (or equivalent portion thereto) so that static electricity charged on the film F is allowed to escape through the above-described path, thereby the film is prevented from being fogged by the discharge of static electricity.

Figure 5A:
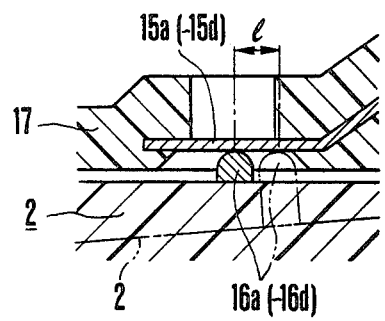
Figure 5C:
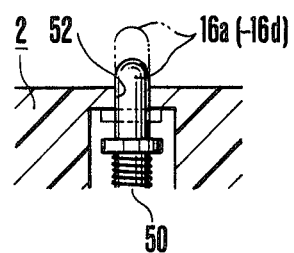
Figure 5B:
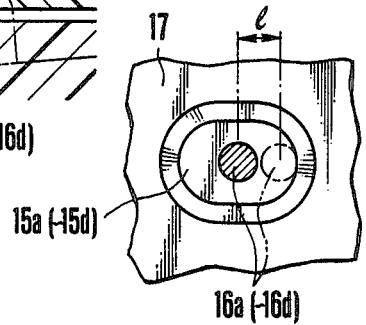
Figure 6:
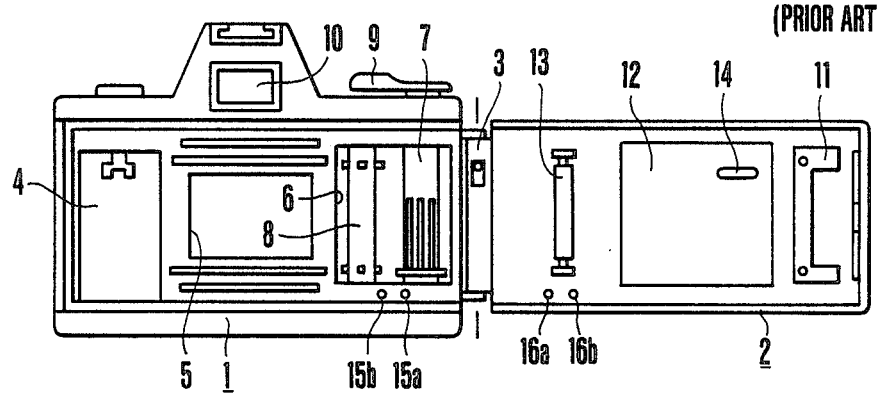
FIGS. 6 and 7 are back elevational views of the conventional camera with its back cover opened to illustrate two examples of the layout of arranging the contact elements respectively.
Figure 7:
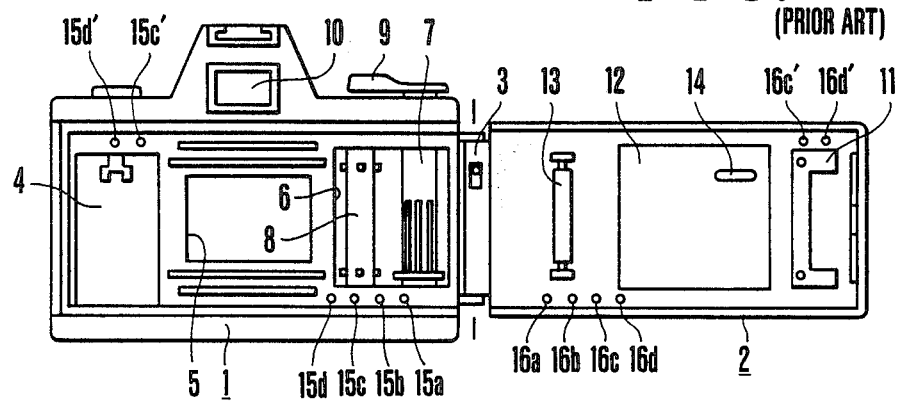
Figure 8:
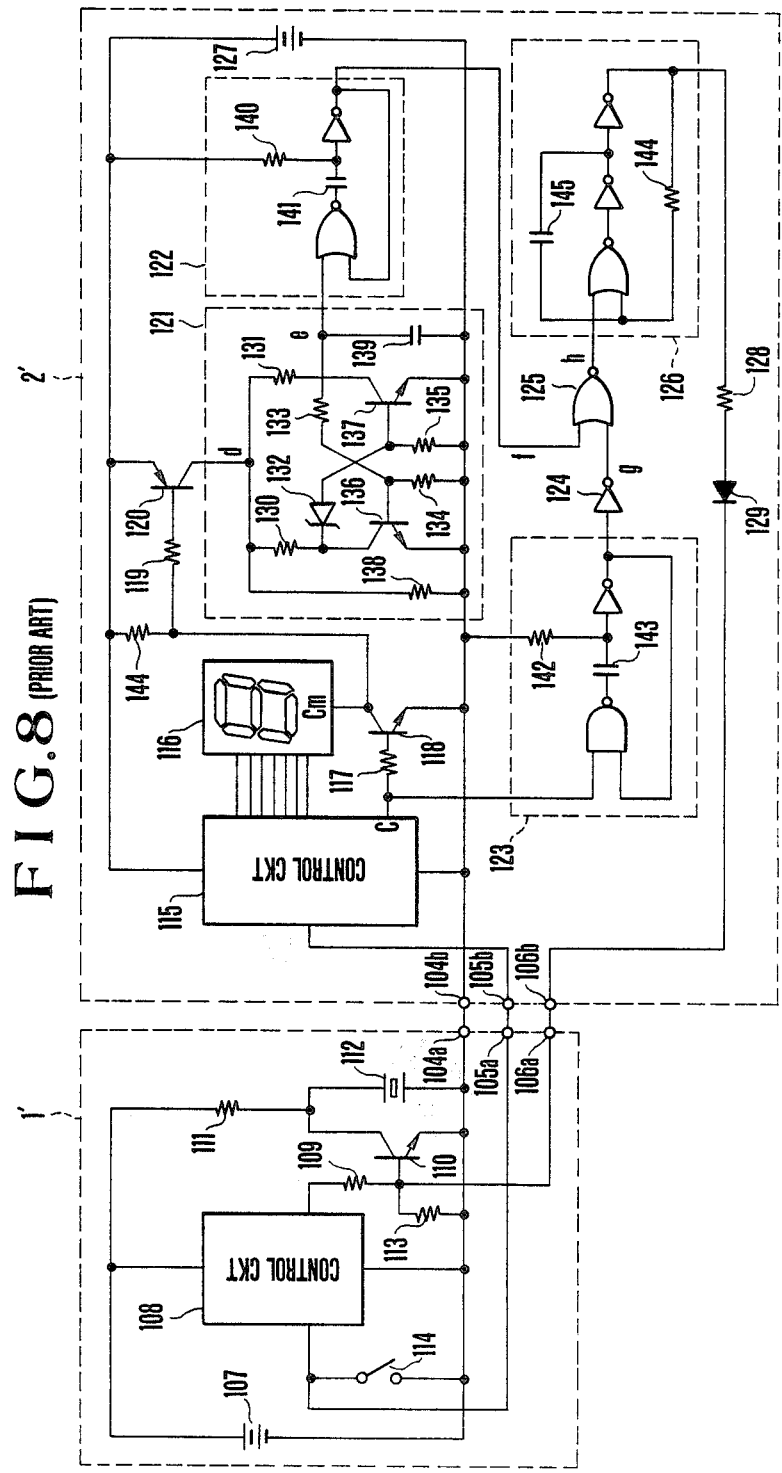
FIG. 8 is an electrical circuit diagram illustrating an example of the conventional circuit structure.

In order that each contact element 16a–16d of the back cover 2 does not scratch the surface of the holder 17 as they rub in the progress of closure of the back cover 2, each contact element 15a–15d (each window portion of the surface of the holder 17 through which the contact element is exposed to the air) is made a laterally elongated round shape as shown in FIGS. 5(a) and 5(b) and FIG. 3. The use of the laterally elongated round shape has another advantage that the pitch between the successive two of the contact elements 16a to 16d of the camera body can be made narrower to easily cope with the increase in the number of contact elements.

The self-cleaning effect at the time of touch of the contact element will be explained by reference to FIG. 2 and FIGS. 5(a), 5(b) and 5(c). As the back cover 2 is closed, the contact elements 16a to 16d start to come in contact with the contact elements 15a to 15d of the camera body 1 in the position shown by double dot-and-single dash lines. By further closing of the back cover 2, the back cover side contact elements 16a to 16d, while sinking in the direction of their own axis (downward as viewed in FIG. 5(a)) against the bias forces of the spring members 50, slidingly move on the camera body side contact elements 15a to 15d (to the left as viewed in FIG. 5(b)), finally reaching the position shown by solid lines in which the closing of the back cover 2 complete (with a locking of the back cover 2). That is, any one of the contact elements is self-cleaned by the fact that the confronted contact elements of the camera body 1 and the back cover 2 slide against each other in the area of length l, (FIGS. 5(a), 5(b)).

In the embodiment described above, the following advantages can be produced.

(1) Since all the confronted contact elements of the camera body and the back cover are arranged in the neighbourhood of the axis of rotation of the back cover and in one row on a line almost parallel to the axis of rotation, all the contact elements have the same and maximum self-cleaning effect, producing a great advantage of preventing a poor electrical connection.

(2) Because the pre-designed internal space has little influence by the effective utilization of the dead space, there is a large degree of freedom on the contact element layout, and a further increase in the number of contact elements can be easily coped with.

(3) Because many contact elements can be arranged adjacent to one another in a single area, the mounting and assembling are very easy to perform. Therefore, the cost effectiveness is increased.

(4) The contact element arrangement does not increase the size of the camera.

(5) Because each pair of confronted contact elements of the camera body and the back cover is positioned in the neighbourhood of the axis of rotation of the back cover, the positional accuracy is high.

(6) The contact elements of the back cover are arranged near the finger-rest portion (grip). Therefore, the internal space can be taken wide, and a large degree of freedom can be given to the design of the movable mechanism and mounting.

(7) Since the contact elements are arranged in that portion of the camera which is positioned near the axis about which the back cover turns when it opens and closes, the right hand portion of the camera which as viewed from the back cover side has a wide flat area, can be effectively utilized. Therefore, mounting effectiveness is increased.

In the above-described embodiment, the camera body side and the back cover side contact elements are made one row. But, of course, a plurality of rows including two rows also can be utilized in the present invention.

Also, in the above-described embodiment, the above-described self-cleaning action is obtained by making the camera body side contact elements fixed, and the back cover side contact elements movable (in the axial direction). But, this relationship may be reversed. That is, the camera body side contact elements becomes movable, and the back cover side contact elements become fixed. Even in this case, a similar self-cleaning action can be obtained.

What is claimed is:

1. A camera comprising:
   a camera body containing a film winding spool on one side of the camera body and a guide member, arranged near said spool for guiding the film into said spool for auto-loading, a back cover, which may be opened, attached to the camera body by means of an opening shaft, and a contact device including a plurality of contacts on the camera body and a plurality of contacts on the back cover, said opening shaft being located on the side of the camera body on which the spool is arranged, a suppor member located between said spool and said back cover, said guide member being supported by said support member, and located in the zone between said support member and said spool;
   said plurality of contacts on the camera body being arranged on the back cover side of said support member in at least one train generally parallel to the axial direction of said opening shaft, and
   said plurality of contacts on the back cover being arranged at a position to contact said contacts on the camera body.

2. A camera according to claim 1, wherein at least either one of said camera body side contact elements and said back cover side contact elements are made configured to move resiliently.

3. A camera according to claim 2, wherein said back cover side contact elements are configured to move resiliently, and further at least said camera side contact elements are made of a size having an area capable of sliding contact with said back cover side contact elements in the final stage of a closing operation of said back cover.

4. A camera according to claim 3, wherein said camera body side contact elements are formed in an elongated round shape having its length extending in a direction generally perpendicular to the axis of said shaft.

5. A camera according to claim 1, further comprising:
   a grip protruding from said back cover on the back of the positions of said back cover side contact elements, said grip being used as a finger rest for the thumb.

6. A camera comprising:
   a camera body containing a film winding spool arranged on one side of the camera body, and a guide member arranged near said spool for guiding said film into said spool for auto-loading, a back cover, which can be opened, attached to said camera body by means of a detachable openign shaft;
   a contact device comprising a plurality of contacts arranged on the camera body so as to provide an electrical connection with a plurality of contacts arranged on the back cover when the cover is closed, further compriising:
   a bearing member for supporting said opening shaft of said back cover, arranged on the side of the camera body on which said spool is arranged,
   a support member arranged in the back of the spool, located between said spool and said back cover, said guide member being supported by said support member, and located in the zone between said support member and said spool, and
   said plurality of contacts on the camera body being arranged on the back side face of said support member in at least one train generally parallel to the axial direction of said opening shaft.

7. A device according to claim 1, wherein said guide member includes a roller elastically urged toward said spool and guides the leading portion of the film along the peripheral surface of said spool during the auto-loading.

* * * * *

UNITED STATES PATENT AND TRADEMARK OFFICE
CERTIFICATE OF CORRECTION

PATENT NO. : 4,751,538

DATED : June 14, 1988

INVENTOR(S) : Tatsuo Konno

It is certified that error appears in the above-identified patent and that said Letters Patent is hereby corrected as shown below:

COLUMN 1

Line 30, "cack cover 2" should read --back cover 2--.

COLUMN 3

Line 11, "monstable" should read --monostable--;
Line 32, "changing" should read --charging--; and
Line 56, "or" should read --for--.

COLUMN 5

Line 57, "always" should read --to always--.

COLUMN 6

Line 35, "complete" should read --is complete--.

UNITED STATES PATENT AND TRADEMARK OFFICE
CERTIFICATE OF CORRECTION

PATENT NO. : 4,751,538  Page 2 of 2

DATED : June 14, 1988

INVENTOR(S) : Tatsuo Konno

It is certified that error appears in the above-identified patent and that said Letters Patent is hereby corrected as shown below:

COLUMN 7

Line 4, "camera" should read --camera,--;
        Line 18, "becomes" should read --become--; and
        Line 35, "suppor" should read --support--.

COLUMN 8

Line 25, "openign" should read --opeining--;
        Line 30, "compriising" should read --comprising--; and
        Line 43, "device" should read --camera--.

Signed and Sealed this

Twenty-first Day of March, 1989

Attest:

DONALD J. QUIGG

*Attesting Officer*  *Commissioner of Patents and Trademarks*